US010446818B2

United States Patent
Hashimoto et al.

(10) Patent No.: US 10,446,818 B2
(45) Date of Patent: Oct. 15, 2019

(54) POWER SOURCE DEVICE (71) Applicant: SANYO Electric Co., Ltd., Osaka (JP)

(72) Inventors: Hiroyuki Hashimoto, Hyogo (JP); Shingo Ochi, Hyogo (JP); Tatsuhito Horiuchi, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 235 days.

(21) Appl. No.: 15/527,321

(22) PCT Filed: Jul. 7, 2015

(86) PCT No.: PCT/JP2015/003406
§ 371 (c)(1),
(2) Date: May 16, 2017

(87) PCT Pub. No.: WO2016/132404
PCT Pub. Date: Aug. 25, 2016

(65) Prior Publication Data
US 2017/0331089 A1 Nov. 16, 2017

(30) Foreign Application Priority Data
Feb. 16, 2015 (JP) .................................. 2015-027159

(51) Int. Cl.
*H01M 2/10* (2006.01)
*H01M 2/12* (2006.01)
*H01M 2/02* (2006.01)

(52) U.S. Cl.
CPC ....... *H01M 2/1241* (2013.01); *H01M 2/0275* (2013.01); *H01M 2/1077* (2013.01);
(Continued)

(58) Field of Classification Search
CPC ............. H01M 2/1241; H01M 2/1252; H01M 2/0275; H01M 2/1077; H01M 2/12; H01M 2/1061; H01M 2220/20
See application file for complete search history.

(56) References Cited

U.S. PATENT DOCUMENTS

| 2007/0207377 A1* | 9/2007 | Han | H01M 2/021 429/162 |
| 2008/0171259 A1* | 7/2008 | Kanai | H01G 9/016 429/53 |

(Continued)

FOREIGN PATENT DOCUMENTS

| JP | 2006-236605 | 9/2006 |
| JP | 2011-054420 | 3/2011 |

(Continued)

OTHER PUBLICATIONS

International Search Report of PCT application No. PCT/JP2015/003406 dated Oct. 13, 2015.

*Primary Examiner* — Muhammad S Siddiquee
(74) *Attorney, Agent, or Firm* — Wenderoth, Lind & Ponack, L.L.P.

(57) ABSTRACT

In order to allow gas discharged from a pouch cell to be guided to a predetermined position, a power source device includes one or a plurality of pouch cells (10) having laminated film outer casing (11), and a housing member (20) enclosing the one or multiple pouch cells (10). The one or plurality of pouch cells (10) each includes thermally welded portion (13) formed by thermally welding the laminated film, and gas discharge portion (14) provided in at least a part of thermally welded portion (13). Housing member (20) includes exhaust port (22) communicating with gas discharge portion (14) of one or a plurality of pouch cells (10).

7 Claims, 8 Drawing Sheets (52) U.S. Cl.
CPC ........... *H01M 2/12* (2013.01); *H01M 2/1252* (2013.01); *H01M 2/1061* (2013.01); *H01M 2220/20* (2013.01)

(56) References Cited

U.S. PATENT DOCUMENTS

| | | | |
|---|---|---|---|
| 2010/0239895 A1* | 9/2010 | Yang | H01M 2/0207 429/53 |
| 2011/0027632 A1* | 2/2011 | Higashino | B60K 1/04 429/83 |
| 2013/0122335 A1 | 5/2013 | Park et al. | |
| 2013/0280565 A1* | 10/2013 | Lee | H01M 2/0207 429/71 |
| 2014/0333239 A1* | 11/2014 | Yokoyama | H01M 2/20 318/139 |

FOREIGN PATENT DOCUMENTS

| | | |
|---|---|---|
| JP | 2012-028353 | 2/2012 |
| JP | 2013-105742 | 5/2013 |

\* cited by examiner

POWER SOURCE DEVICE

CROSS-REFERENCE TO RELATED APPLICATIONS

This application is a U.S. national stage application of the PCT International Application No. PCT/JP2015/003406 filed on Jul. 7, 2015, which claims the benefit of foreign priority of Japanese patent application No. 2015-027159 filed on Feb. 16, 2015, the contents all of which are incorporated herein by reference.

TECHNICAL FIELD

The present invention relates to a power source device.

BACKGROUND ART

In recent years, an electrically-driven vehicle equipped with a power source device including a plurality of battery cells as a power source for motor of a hybrid car or an electric vehicle has been popular. Furthermore, a power source device used for a storage system combined with a generator such as a solar cell and storing electric power generated by the generator has been also known. In these power source devices, as the battery cell, for example, chargeable and dischargeable secondary batteries such as a lithium ion battery and a nickel hydrogen battery are used.

Examples of the battery cell include a prismatic cell including an outer casing made of a metal outer can, a pouch cell including an outer casing made of a thin laminated film and having low rigidity, and the like. When a battery cell is in an abnormal state, an internal pressure of the battery cell increases and gas is generated in the outer casing.

The outer casing of the prismatic battery includes a bottomed metal can with one surface opened, and a sealing body for closing the opened surface of the metal can. The sealing body is provided with a safety valve. When pressure in the outer can increases, the safety valve is opened and gas can be discharged. On the other hand, an outer casing of a pouch cell is made of one laminated film. Specifically, a power-generating element such as an electrode plate is enclosed by a laminated film, and an overlapped portion of the laminated film is thermally welded so as to seal four sides. Thus, an outer casing is formed. In the battery cell having such a configuration, when an internal pressure of the outer casing of the battery cell increases, the thermally welded portion of the laminated film is peeled off or broken, and gas generated in the outer casing is discharged. Therefore, in the pouch cell, it is difficult to specify a position in which the gas is discharged.

In view of such circumstances, a pouch cell having a structure capable of specifying a gas discharged position in the thermally welded portion has been proposed. For example, in a pouch cell disclosed in the following Patent Literature, when a laminated film is thermally welded, a section whose adhesion strength of thermal welding is intentionally reduced is provided by, for example, a method of changing area thermally welded. Thus, a gas discharge portion is formed in a part of the thermally welded portion of the laminated film. In this configuration, when an internal pressure in the outer casing increases, the thermally welded portion is peeled off or broken from the section whose adhesion strength is low in the thermally welded portion. Accordingly, it becomes easy to specify a gas discharge position.

CITATION LIST

Patent Literature

PTL 1: Japanese Patent Application Unexamined Publication No. 2013-105742

SUMMARY OF THE INVENTION

On the other hand, depending on use of a power source device, gas discharged from a battery cell is required to be derived to a predetermined place. In a prismatic battery, a configuration having a duct disposed in close contact with a safety valve has been known. In a pouch cell, since an outer casing is deformable, even when the above-mentioned configuration is employed, it is difficult to hermetically connect the gas discharge portion and the duct to each other.

The invention of the present application has been made under such circumstances, and the main object of the invention is to provide a power source device having a structure capable of hermetically connecting a gas discharge portion of a pouch cell and a duct to each other.

A power source device in accordance with one aspect of the present invention includes one or a plurality of pouch cells each having a laminated film outer casing, and a housing member enclosing the one or plurality of pouch cells. Each of the one or plurality of pouch cells includes a thermally welded portion formed by thermally welding the laminated film and a gas discharge portion provided in at least a part of the thermally welded portion. The housing member includes an exhaust port that communicates with the gas discharge portion of the one or plurality of pouch cells.

According to a configuration of a power source device mentioned above, gas discharged from an outer casing of a pouch cell is discharged from an exhaust port of a housing member enclosing the pouch cell. The housing member has a duct connected to the exhaust port, thus enabling the gas discharge portion of the pouch cell and the duct to communicate with each other.

DETAILED DESCRIPTION OF THE PREFERRED EMBODIMENT

Power source device 1 in accordance with a first exemplary embodiment of the present invention is described below in detail with reference to FIGS. 1 to 4. Power source device 1 shown in FIGS. 1 to 3 include a plurality of pouch cells 10, housing member 20 having a tubular outer shape, and a pair of resin members 30 fitted to housing member 20. A plurality of pouch cells 10 is disposed inside housing member 20. As pouch cell 10, a lithium ion battery, a nickel hydrogen battery, and other various secondary batteries can be used.

Figure 4:
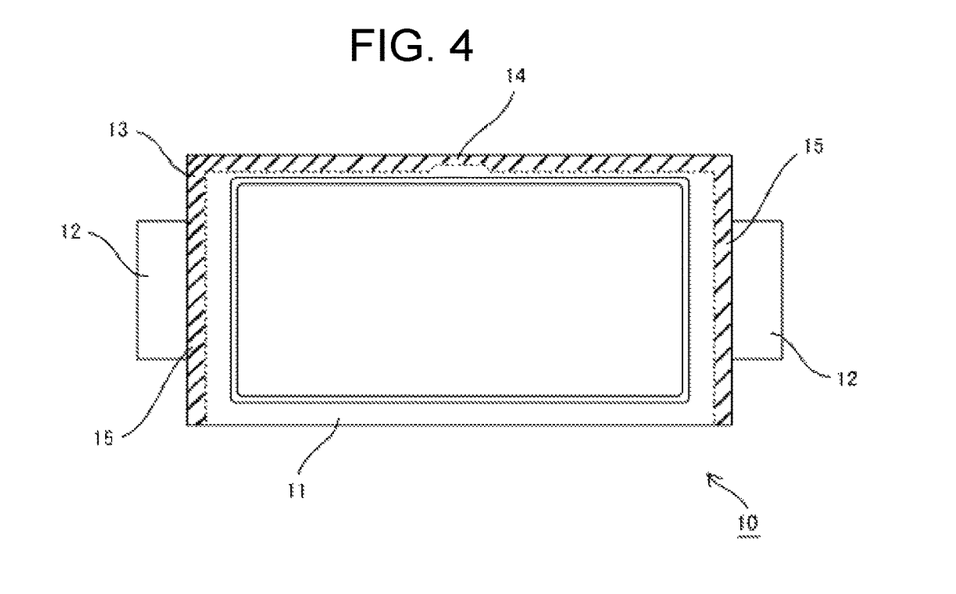
FIG. 4 is a front view of a pouch cell in accordance with the first exemplary embodiment of the present invention.

As shown in FIG. 4, pouch cell 10 includes outer casing 11 formed of a deformable laminated film, a power-generating element enclosed inside outer casing 11, and a pair of electrode tabs 12 for outputting electric power generated by the power-generating element. The power-generating element includes an electrode body, an electrolyte solution, and the like. Electrode tab 12 is an output terminal of pouch cell 10, and is derived from the inside of outer casing 11 to the outside of outer casing 11.

As a pouch cell of this type, a configuration including a flat wound electrode body or a stacked electrode body as an electrode body has been known. The wound electrode body is formed by winding a positive electrode plate and a negative electrode plate with a separator disposed therebetween, followed by pressing the wound product into a flat shape. The stacked electrode body is formed by stacking a sheet-like positive electrode plate and negative electrode plate with a separator disposed therebetween. As the above-mentioned laminated film, for example, a sheet-like composite film having a five-layered structure of a resin layer (polypropylene)/adhesive layer/aluminum alloy layer/adhesive layer/resin layer (polypropylene) and the like is well known.

In a power source device in accordance with one aspect of the present invention, an electrode body is not necessarily limited to the above-mentioned configuration. Any configuration capable of enclosing the power-generating elements in outer casing 11 may be employed. Furthermore, a laminated film may be any composite films having various structures.

Pouch cell 10 shown in FIG. 4 is formed by disposing an electrode body on one laminated film, folding the laminated film, and thermally welding the laminated film on a side other than the folded side. With this configuration, outer casing 11 is provided with thermally welded portion 13 in at least a part of the periphery of the outer casing. Specifically, the hatched regions in FIG. 3 corresponds to thermally welded portion 13.

Thermally welded portion 13 includes a pair of deriving portions 15 provided at both ends of outer casing 11 and gas discharge portion 14 provided between the pair of deriving portions 15. For example, in the pouch cell of FIG. 4, deriving portions 15 are formed by thermally welding two laminated films with electrode tab 12 interposed between the laminated films. In pouch cell 10, electrode tabs 12 are derived from deriving portions 15, respectively. Electric power generated by the power-generating element in outer casing 11 can be taken out via electrode tab 12.

Gas discharge portion 14 is configured to have weaker adhesion strength than the other region in thermally welded portion 13. For example, in the pouch cell of FIG. 4, gas discharge portion 14 is formed by thermally welding a laminated film such that a width of an area of the thermally welded portion becomes narrower than that of the other regions. With this configuration, when an internal pressure of outer casing 11 increases, the thermally welded portion of gas discharge portion 14 is firstly peeled off or broken. Consequently, it is possible to specify a gas generated section in the pouch cell.

Figure 1:
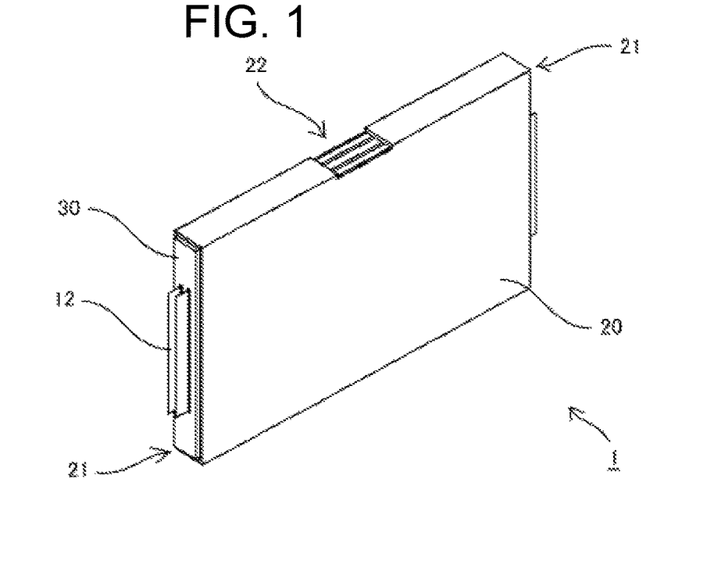
FIG. 1 is a perspective view of a power source device in accordance with a first exemplary embodiment of the present invention.

As shown in FIG. 1, tubular housing member 20 has opening parts 21 at both ends. Housing member 20 is also provided with exhaust port 22 in addition to openings of opening parts 21 on both ends. Exhaust port 22 is provided on a side surface of tubular housing member 20. It is preferable that housing member 20 is made of hard material such as metal, and is configured to have relatively high rigidity.

Figure 2:
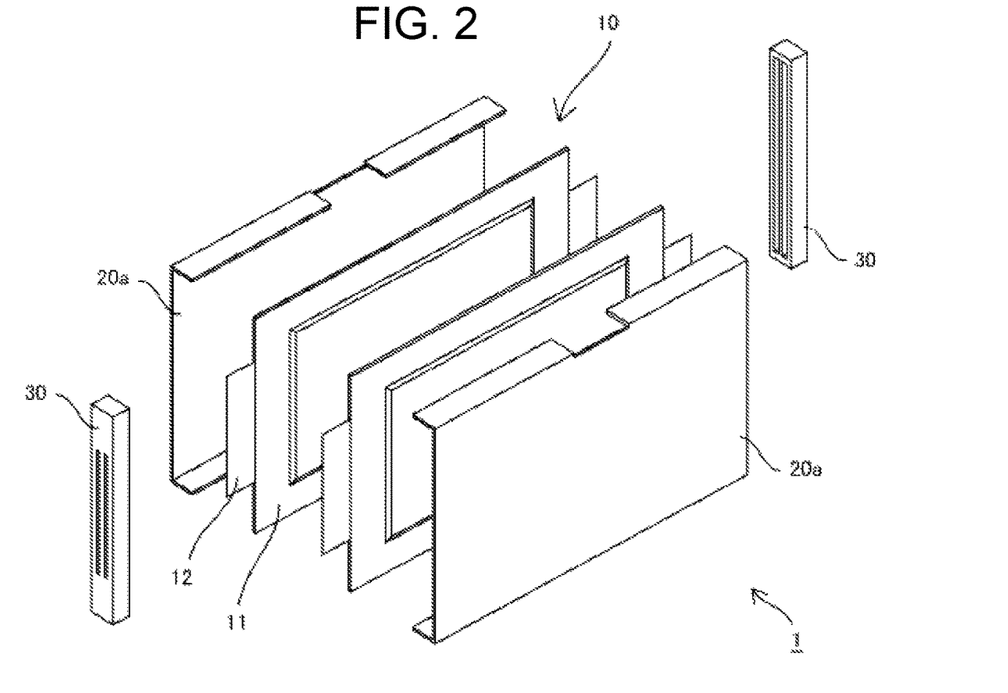
FIG. 2 is an exploded perspective view of the power source device of FIG. 1.
Figure 3:
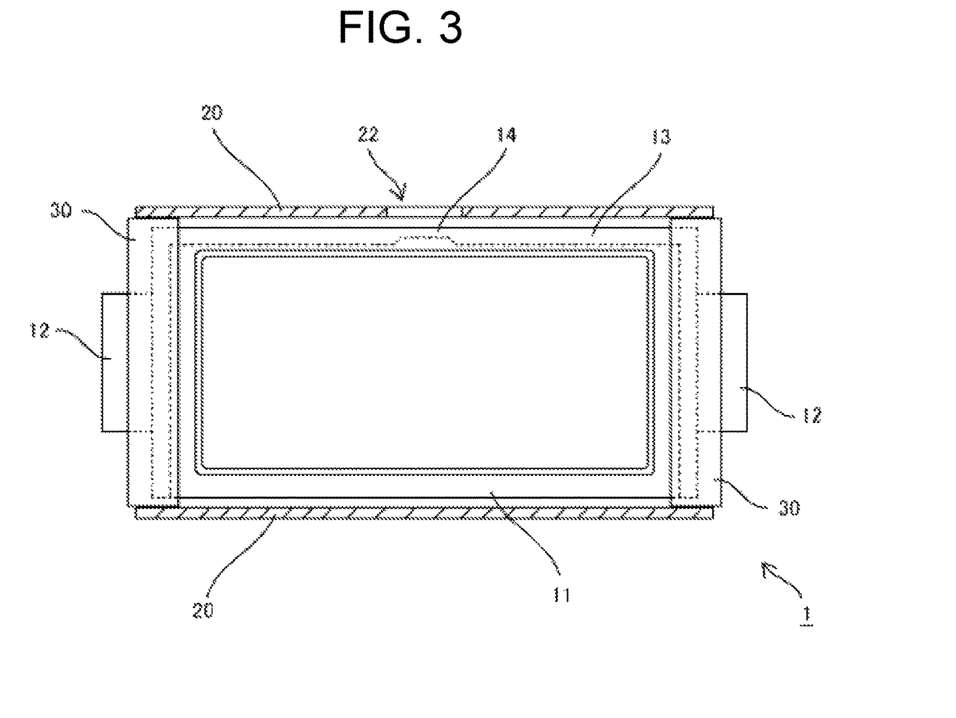
FIG. 3 is a sectional view of the power source device of FIG. 1.

As shown in FIG. 2, housing member 20 can be formed by combining a pair of plates 20a to each other. The pair of plates 20a are fitted to each other such that they are overlapped with each other. Thus, a plurality of pouch cells 10 disposed between plates 20a are housed. The pair of plates 20a are provided with cut-away parts, respectively, allowing exhaust port 22 to be formed when the pair of plates 20a are combined to each other to form housing member 20. Note here that in the configuration shown in FIG. 2, a labyrinth structure is formed in the fitted part of the pair of plates 20a, thus enabling the airtightness in housing member 20 to be improved. Furthermore, the airtightness can be also enhanced by welding the overlapped parts of two plates 20a.

A plurality of pouch cells 10 housed in housing member 20 are stacked with wide surfaces thereof facing each other. The plurality of pouch cells 10 are stacked in a predetermined posture. Electrode tabs 12 of adjacent pouch cells 10 are brought near to each other, and adjacent gas discharge portions 14 of adjacent pouch cells 10 are brought near to each other. Pouch cells 10 in a stacked state are housed in housing member 20 in a predetermined posture such that gas discharge portions 14 of the pouch cells correspond to the position of exhaust port 22 of housing member 20.

As shown in FIGS. 1 and 2, a pair of resin members 30 are fitted to opening parts 21 of housing member 20, respectively, so as to cover the openings of opening parts 21. Furthermore, each resin member 30 has a through hole through which electrode tab 12 of pouch cell 10 to be inserted. A part of pouch cell 10 including electrode tab 12 and deriving portion 15 is inserted into the through hole. With this configuration, pouch cell 10 can be housed inside housing member 20 with electrode tab 12 derived to the outside of housing member 20.

Note here that a sealing member such as an elastic body may be disposed between each resin member 30 and an inner wall of housing member 20 or between an inner wall of the through hole of each resin member 30 and pouch cell 10. Disposing of the sealing member can improve the airtightness of housing member 20. Furthermore, it is preferable that the sealing member disposed on the inner wall of the through hole of resin member 30 is provided in a position sandwiching thermally welded portion 13 of pouch cell 10.

This configuration can enhance the adhesion strength of the laminated films of deriving portion 15. For example, even in a pouch cell provided with gas discharge portion 14, when the internal pressure of outer casing 11 rapidly increases, the thermally welded portion of deriving portion 15 in addition to gas discharge portion 14 may be peeled off or broken. However, the above-mentioned configuration can prevent gas from being discharged from regions other than gas discharge portion 14 of thermally welded portion 13.

In power source device 1 having the above-mentioned configuration, gas discharge portions 14 of a plurality of pouch cells 10 are disposed corresponding to the position of exhaust port 22 of housing member 20. With this configuration, gas discharged from the pouch cell is discharged toward exhaust port 22. When housing member 20 and a vehicle-side duct and the like, are hermetically coupled to each other, it is possible to guide the gas discharged from pouch cell 10 to the inside of the duct. It is difficult to hermetically couple an outer casing formed of a thin laminated film having low rigidity to a duct, but it is relatively easy to hermetically couple a housing member having high rigidity and a duct. Therefore, the above-mentioned power source device enables the gas discharged from pouch cell 10 to be guided to the inside of the duct although the device has a relatively simple structure.

Note here that in the above-mentioned configuration, when resin member 30 and housing member 20 are hermetically coupled to each other via, for example, a sealing member, and the like, gas discharge portion 14 does not necessarily corresponded to a position of exhaust port 22 of housing member 20. In this case, since it is not necessary to specify a gas generating section of the pouch cell, a configuration of the gas discharge portion can be simplified. For example, it is possible to employ a pouch cell provided with an outer casing formed by thermally welding a laminated film in a uniform width. In this configuration, since the adhesion strength of the thermally welded portion also becomes uniform, the entire thermally welded portion becomes gas discharge portion 14. However, when the airtightness inside housing member 20 is high, gas generated inside housing member 20 is discharged from exhaust port 22 to the outside of housing member 20.

With the configuration mentioned above, housing member 20 is configured to house a plurality of pouch cells 10 inside and allow the gas discharged from pouch cell 10 to be discharged from exhaust port 22 of housing member 20. Housing member 20 is more stable in shape as compared with outer casing 11 of pouch cell 10. Therefore, the duct for guiding gas discharged from a pouch cell to a predetermined position can be easily connected to housing member 20. By hermetically connecting housing member 20 and members such as the duct to each other, even when an internal pressure increases and gas is discharged from the pouch cell, the gas can be guided to a predetermined position.

Next, a power source device in accordance with a second exemplary embodiment of the present invention is described below in detail with reference to FIGS. 5 to 13. Note here that the same references numerals are given to members of a common configuration with in the first exemplary embodiment, and detailed description thereof is omitted herein. The power source device shown in FIGS. 5 to 8 includes case 60 for housing a plurality of pouch cells 10. Case 60 includes first case body 61 having an opening part opened upward and second case body 62 for closing the opening part of first case body 61. Second case body 62 is provided with duct portion 63 in the upper part thereof. Duct portion 63 extends along the stacking direction of pouch cells 10 housed in case 60.

Figure 5:
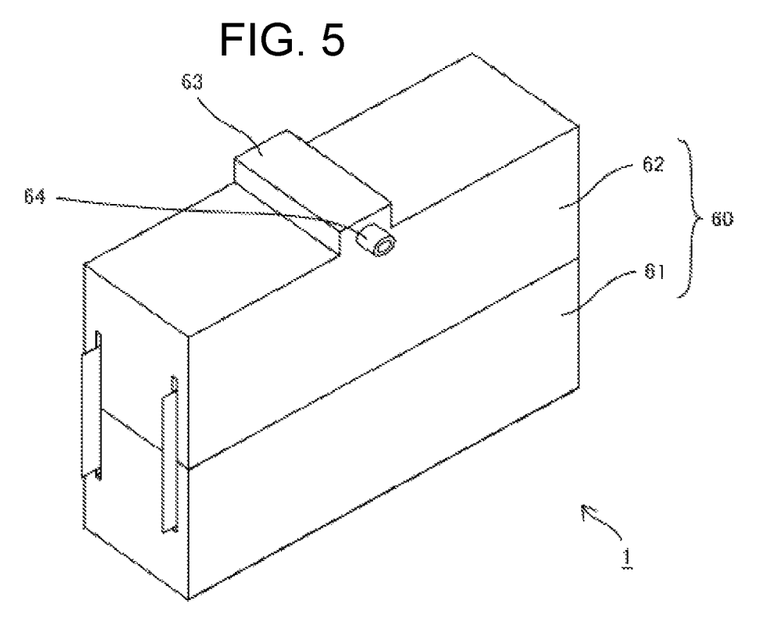
FIG. 5 is a front-side perspective view of a power source device in accordance with a second exemplary embodiment of the present invention.
Figure 6:
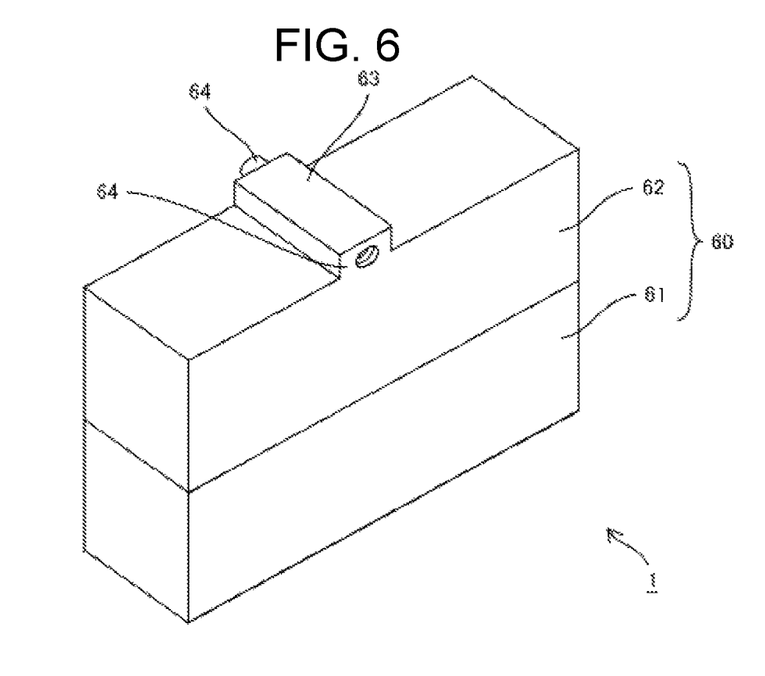
FIG. 6 is a rear-side perspective view of the power source device of FIG. 5.
Figure 9:
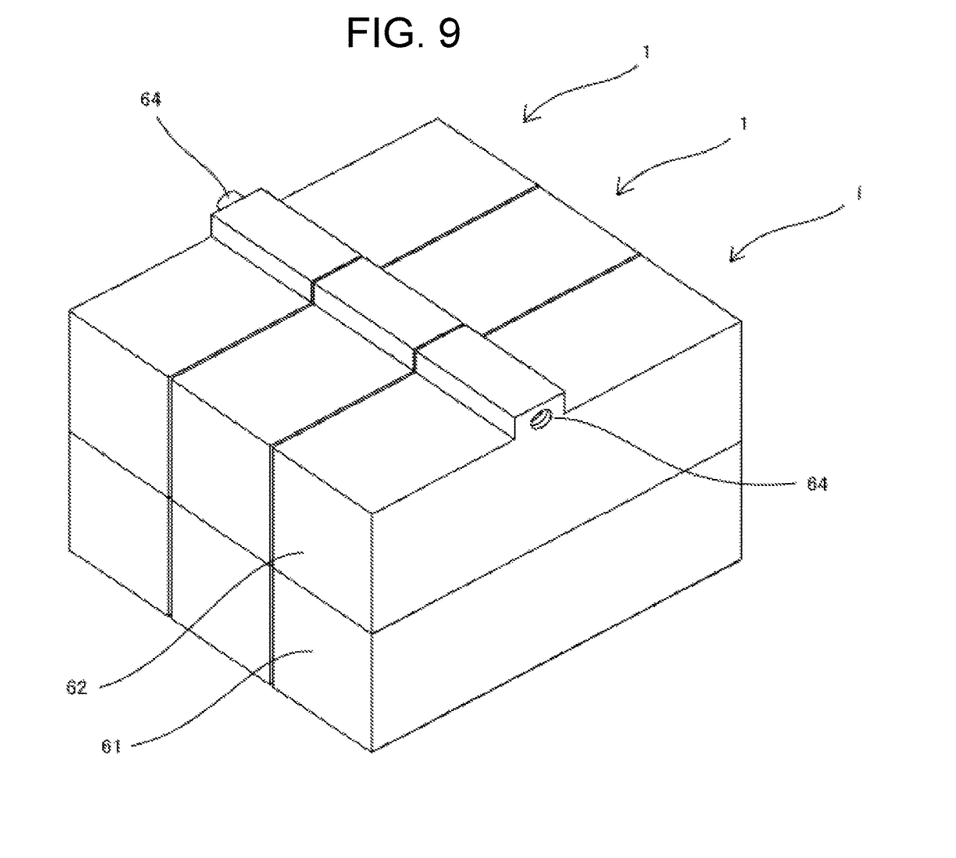
FIG. 9 is a perspective view for illustrating a coupling structure of a coupling portion of a plurality of power source devices in accordance with the second exemplary embodiment of the present invention.

As shown in FIGS. 5 and 6, second case body 62 is provided with coupling portions 64 on both end surfaces in the extending direction of duct portion 63. Coupling portions 64 have coupling holes communicating with duct portion 63, respectively, but have different outer shapes from each other. Specifically, the pair of coupling portions 64 are formed in a shape enabling coupling portions 64 to be fitted to each other so that duct portions 63 of the plurality of second case bodies 62 can be coupled to each other. FIG. 9 shows a state in which coupling portions 64 of the plurality of power source devices 1 are coupled to each other. As shown in FIG. 9, when a plurality of power source devices 1 provided with case 60 are arranged adjacent to each other, duct portions 63 of power source devices 1 can be coupled to each other directly. Consequently, it is not necessary to provide members for coupling duct portions 63 of power source devices 1 to each other.

Figure 7:
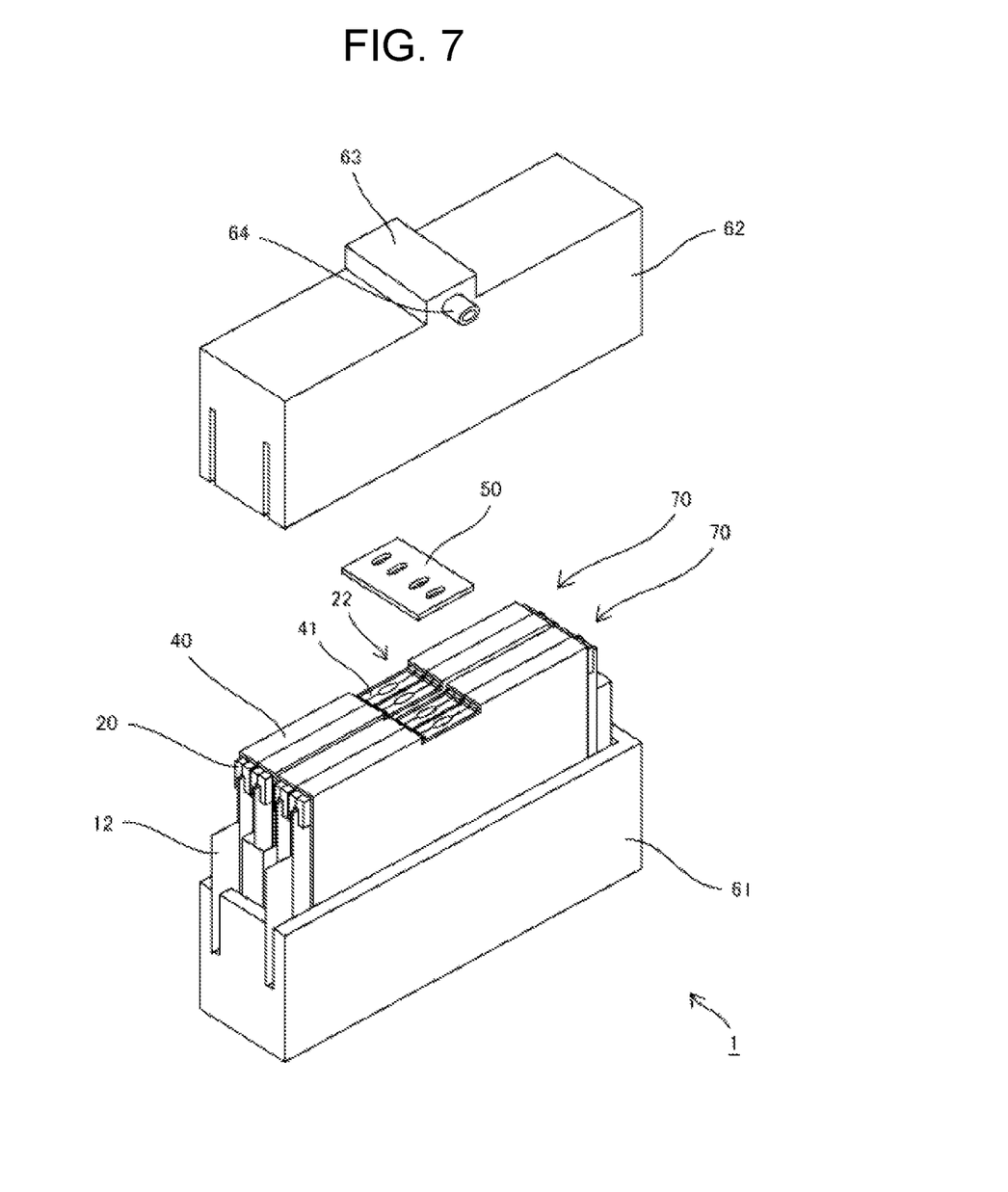
FIG. 7 is an exploded perspective view of the power source device of FIG. 5.
Figure 8:
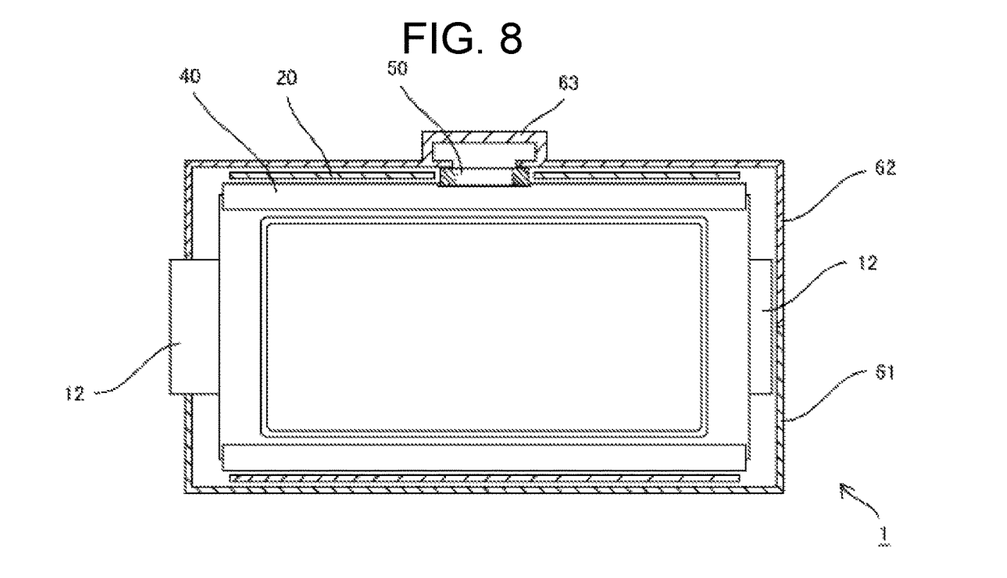
FIG. 8 is a sectional view of the power source device of FIG. 5.

As shown in FIGS. 7 and 8, case 60 includes a plurality of unit modules 70 inside thereof. Each unit module 70 includes a plurality of pouch cells 10. Unit module 70 illustrated in FIG. 7 includes a plurality of pouch cells 10, holding bodies 40 for covering gas discharge portions 14 of pouch cells 10, and housing member 20 for housing the plurality of pouch cells 10 and a plurality of holding bodies 40.

Figure 10:
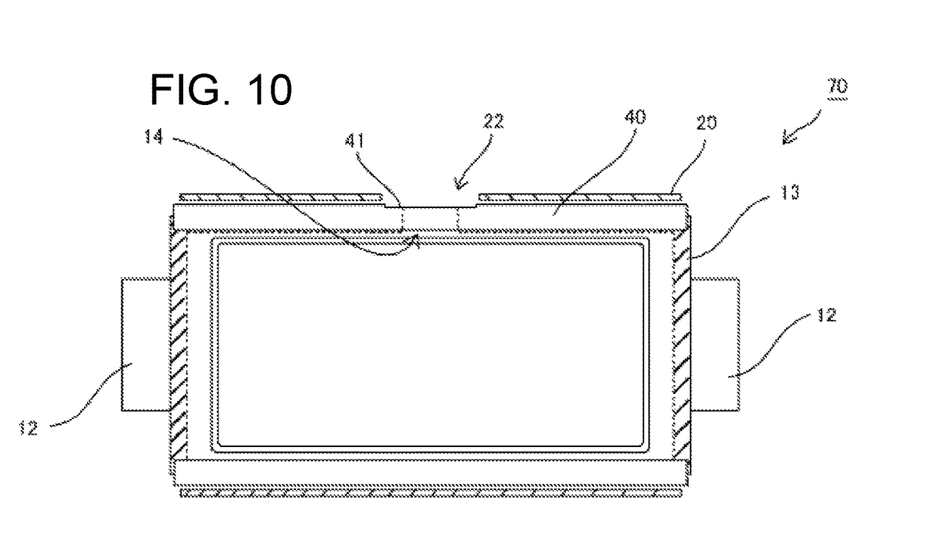
FIG. 10 is a sectional view of a unit module in accordance with the second exemplary embodiment of the present invention.
Figure 11:
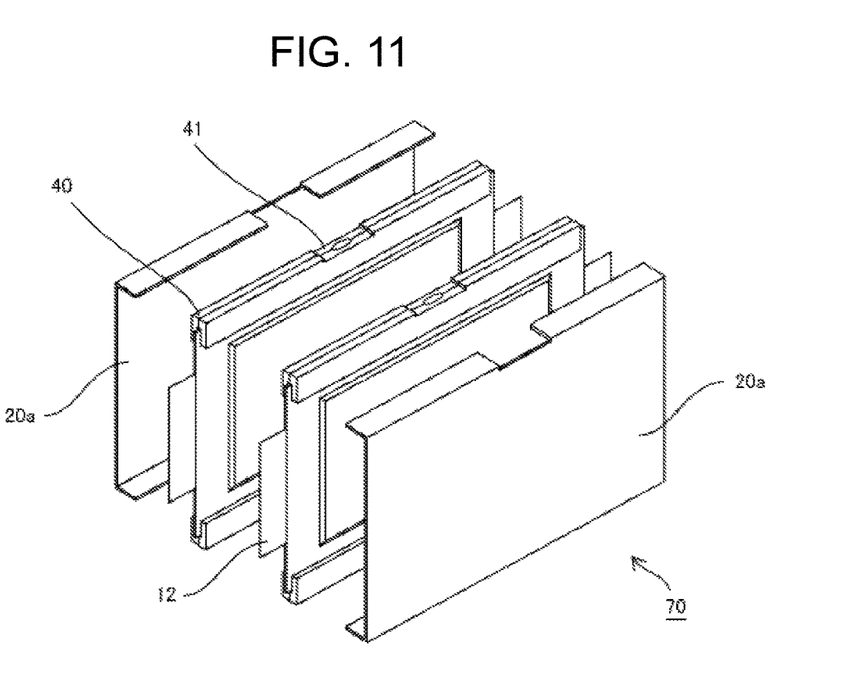
FIG. 11 is an exploded perspective view of the unit module of FIG. 10.

As shown in FIGS. 10 and 11, each holding body 40 is made of two resin members, and configured to sandwich at least a part of thermally welded portion 13 excluding gas discharge portion 14. Holding body 40 has through-hole portion 41 in a position corresponding to gas discharge portion 14. As mentioned above, exhaust port 22 of housing member 20 is provided in a position corresponding to gas discharge portion 14 of the pouch cell housed in housing member 20. Consequently, as shown in FIG. 7, when pouch cell 10 in a state in which holding body 40 is placed is disposed in housing member 20, through-hole portion 41 of holding body 40 is exposed from exhaust port 22 of housing member 20. Furthermore, a thickness of holding body 40 is preferably a dimension such that the holding body is brought into contact with the inner wall of housing member 20 when a plurality of pouch cells sandwiched by holding body 40 is housed inside housing member 20. This configuration can suppress displacement of relative positions of through-hole portion 41 and exhaust port 22 of housing member 20 in a state in which holding body 40 is housed in housing member 20.

Figure 12:
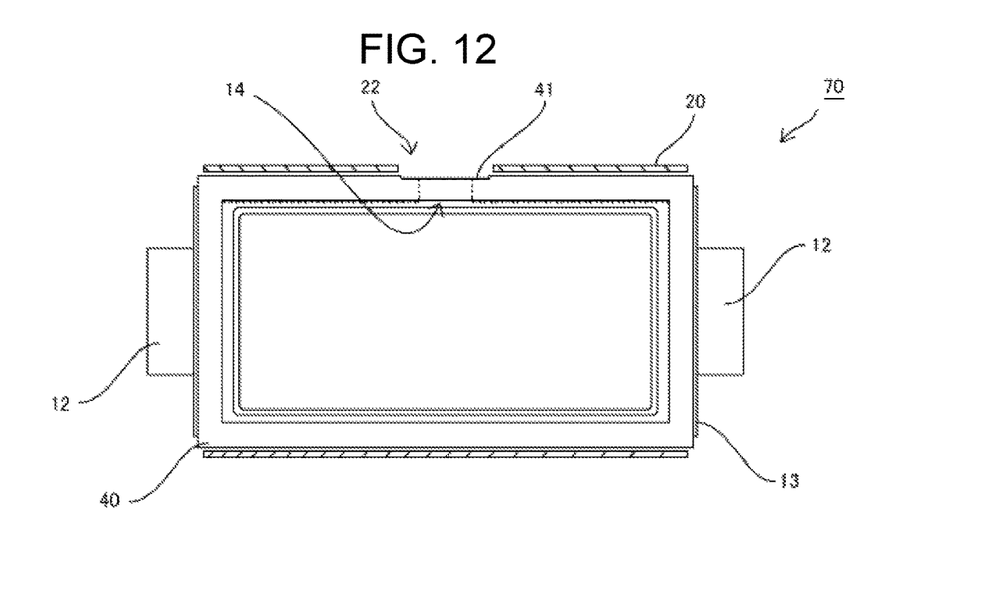
FIG. 12 is a sectional view of a unit module of another example in accordance with the second exemplary embodiment of the present invention.
Figure 13:
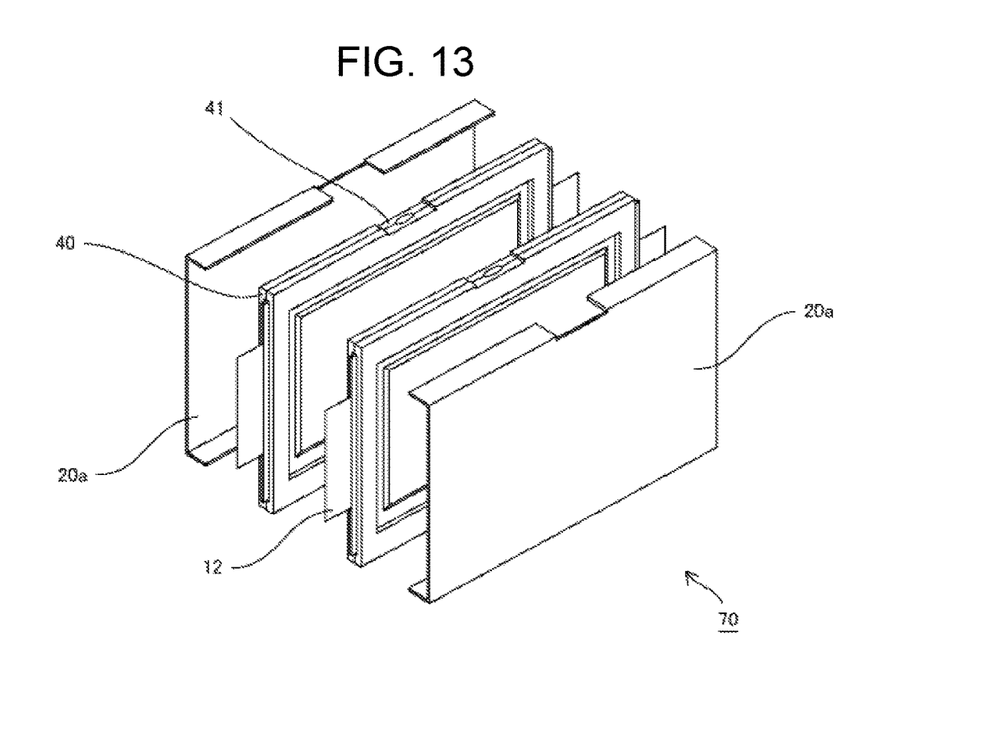
FIG. 13 is an exploded perspective view of the unit module of FIG. 12.

Holding body 40 of FIGS. 12 and 13 is a modified example of holding body 40 of FIGS. 10 and 11. Holding body 40 of FIGS. 12 and 13 is configured to extend along the periphery of pouch cell 10 and sandwich thermally welded portion 13 excluding gas discharge portion 14. This configuration can improve the adhesion strength of thermally welded portion 13 excluding gas discharge portion 14, and prevent gas from being discharged from regions other than gas discharge portion 14 of thermally welded portion 13.

As shown in FIGS. 7 and 8, power source device 1 in accordance with the second exemplary embodiment includes first case body 61, second case body 62, a plurality of unit modules 70, and elastic member 50 disposed between second case body 62 and unit modules 70. The plurality of unit modules 70 is inserted into first case body 61 from its opening part with through-hole portion 41 of holding bodies 40 facing the upper surface. Elastic member 50 is disposed to through-hole portions 41 such that it extends along opening peripheries of the through holes of through-hole portions 41. Elastic member 50 illustrated in FIG. 7 is a sheet-like member having openings. Second case body 62 is coupled to first case body 61 in a state in which a plurality of unit modules 70 is disposed.

As shown in FIG. 8, second case body 62 is provided with duct portion 63 in a position corresponding to through-hole portion 41 of holding body 40. Elastic member 50 is positioned between through-hole portion 41 of holding body 40 and second case body 62. This configuration enables duct portion 63 and through-hole portion 41 of holding body 40 to be hermetically coupled to each other.

With the above-mentioned configuration, holding body 40 can form a flat surface on the periphery of the through hole of through-hole portion 41 positioned above gas discharge portion 14 of pouch cell 10. Furthermore, holding body 40 has higher rigidity than outer casing 11 of pouch cell 10. Therefore, when a duct is disposed so as to press elastic member 50 toward holding body 40, the duct and through-hole portion 41 of holding body 40 can be hermetically coupled to each other.

According to the above-mentioned configuration, gas discharged from gas discharge portion 14 of pouch cell 10 is guided to duct portion 63 of second case body 62 via exhaust port 22 of housing member 20. The gas flowing into duct portion 63 is discharged from the coupling hole of coupling portion 64 provided to duct portion 63. Consequently, by connecting a connection hose or the like to coupling portion 64, it is possible to easily guide the gas discharged from the pouch cell to the predetermined position.

As mentioned above, the present invention is described based on two exemplary embodiments. These exemplary embodiments are described for the exemplary purposes. A person skilled in the art would understand that various modified examples to combinations of components or processing processes are possible, and such modified examples are also encompassed in the scope of the present invention.

The invention claimed is:

1. A power source device comprising:
   one pouch cell or a plurality of pouch cells each having an outer casing formed of a laminated film, each including a thermally welded portion formed by thermally welding the laminated film, and a gas discharge portion provided in at least a part of the thermally welded portion;
   a housing member enclosing the one pouch cell or the plurality of pouch cells and having an exhaust port communicating with the one gas discharge portion or the plurality of the gas discharge portions of the one pouch cell or the plurality of pouch cells; and
   a first case body having an opening part opened upward, and a second case body for closing the opening part, wherein the housing member is disposed between the first case body and the second case body, and the second case body has a duct portion that communicates with the exhaust port of the housing member,
   wherein the second case body includes a pair of coupling portions provided on both end surfaces in an extending direction of the duct portion, and having a coupling hole communicating with the duct portion, and
   the pair of coupling portions are formed in a shape enabling coupling portions to be fitted to each other so that the duct portions of a plurality of second case bodies can be coupled to each other.

2. The power source device according to claim 1, wherein the one gas discharge portion or each of the plurality of the gas discharge portions has a narrower width of an area of the thermally welded portion than other regions of the thermally welded portion.

3. The power source device according to claim 1, wherein the one pouch cell or the plurality of pouch cells each include a power-generating element, a pair of electrode tabs connected to the power-generating element, and a pair of deriving portions provided in a part of the thermally welded portion and deriving the pair of electrode tabs to outside of the outer casing, and
   the gas discharge portion is positioned between the pair of deriving portions.

4. The power source device according to claim 1, wherein the housing member has both of ends of the housing member opened,
   the power source device further comprising a pair of resin members to be coupled to the housing member so as to close openings provided at both of the ends.

5. The power source device according to claim 3, wherein the housing member has both of ends of the housing member opened,
   the power source device further comprising a pair of resin members to be coupled to the housing member, each of the pair of resin members having a through hole for deriving a corresponding electrode tab of the pair of electrode tabs to outside of the housing member, and a sealing member along an inner wall of the through hole.

6. The power source device according to claim 1, further comprising one holding body or a plurality of holding bodies disposed inside the housing member, the one holding body or each of the plurality of holding bodies covering the gas discharge portion of a corresponding pouch cell among the one pouch cell or the plurality of pouch cells, sandwiching at least a part of the thermally welded portion, and including a through-hole portion in a position corresponding to the gas discharge portion,
   wherein the housing member houses the one holding body or the plurality of holding bodies in a posture allowing the through-hole portion to correspond to the exhaust port, and the through-hole portion of the one holding body or each of the plurality of holding bodies is exposed from the exhaust port.

7. A power source device comprising:
   one pouch cell or a plurality of pouch cells each having an outer casing formed of a laminated film, each including a thermally welded portion formed by thermally welding the laminated film, and a gas discharge portion provided in at least a part of the thermally welded portion;
   a housing member enclosing the one pouch cell or the plurality of pouch cells and having an exhaust port communicating with the one gas discharge portion or the plurality of the gas discharge portions of the one pouch cell or the plurality of pouch cells;
   a first case body having an opening part opened upward, and a second case body for closing the opening part, wherein the housing member is disposed between the first case body and the second case body, and the second case body has a duct portion that communicates with the exhaust port of the housing member; and
   an elastic member disposed between the duct portion and the one holding body or the plurality of holding bodies, and positioned along a through hole of the through-hole portion of the one holding body or each of the plurality of holding bodies,
   wherein the second case body includes a pair of coupling portions provided on both end surfaces in an extending direction of the duct portion, and having a coupling hole communicating with the duct portion, and the pair of coupling portions are formed in a shape enabling coupling portions to be fitted to each other so that the duct portions of a plurality of second case bodies can be coupled to each other.

\* \* \* \* \*